US012779431B2

(12) United States Patent
Kim et al.

(10) Patent No.: US 12,779,431 B2
(45) Date of Patent: Nov. 3, 2026

(54) METHOD FOR PREPARING SUPER ABSORBENT POLYMER COMPOSITE

(71) Applicant: LG Chem, Ltd., Seoul (KR)

(72) Inventors: Jong Hun Kim, Daejeon (KR); Yong Jin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 629 days.

(21) Appl. No.: 18/270,569

(22) PCT Filed: Jan. 12, 2023

(86) PCT No.: PCT/KR2023/000546
§ 371 (c)(1),
(2) Date: Jun. 30, 2023

(87) PCT Pub. No.: WO2024/014636
PCT Pub. Date: Jan. 18, 2024

(65) Prior Publication Data

US 2025/0073674 A1 Mar. 6, 2025

(30) Foreign Application Priority Data

Jul. 12, 2022 (KR) ........................ 10-2022-0085865

(51) Int. Cl.
*B01J 20/26* (2006.01)
*B01J 20/28* (2006.01)
*B01J 20/30* (2006.01)

(52) U.S. Cl.
CPC ....... *B01J 20/267* (2013.01); *B01J 20/28016* (2013.01); *B01J 20/3085* (2013.01)

(58) Field of Classification Search
None
See application file for complete search history.

(56) References Cited

U.S. PATENT DOCUMENTS

| | | | |
|---|---|---|---|
| 4,734,478 | A | 3/1988 | Tsubakimoto et al. |
| 2007/0066167 | A1 | 3/2007 | Wada et al. |

(Continued)

FOREIGN PATENT DOCUMENTS

| | | | |
|---|---|---|---|
| CN | 101768237 A | 7/2010 | |
| EP | 0480031 A1 | 4/1992 | |

(Continued)

OTHER PUBLICATIONS

International Search Report for PCT/KR2023/000546 mailed Apr. 14, 2023. 3 pages. (see pp. 2-3, categorizing the cited references.).

(Continued)

*Primary Examiner* — Joseph D Anthony
(74) *Attorney, Agent, or Firm* — Lerner David LLP

(57) ABSTRACT

Provided is a method for preparing a super absorbent polymer composite including: preparing super absorbent polymer particles including a crosslinked polymer of an aqueous ethylenically unsaturated monomer having an at least partially neutralized acid group and an internal cross-linking agent, water treating the super absorbent polymer particles to adsorb moisture on the super absorbent polymer particles, and mixing the water-treated super absorbent polymer particles and an anti-caking agent to adhere the anti-caking agent on the water-treated super absorbent polymer particles.

7 Claims, 1 Drawing Sheet

(56) References Cited

U.S. PATENT DOCUMENTS

| | | | |
|---|---|---|---|
| 2009/0186542 | A1 | 7/2009 | Kondo et al. |
| 2011/0224361 | A1 | 9/2011 | Daniel et al. |
| 2011/0237735 | A1 | 9/2011 | Funk et al. |
| 2012/0058267 | A1 | 3/2012 | Stueven et al. |
| 2013/0172180 | A1 | 7/2013 | Naumann et al. |
| 2017/0036191 | A1 | 2/2017 | Yang et al. |
| 2017/0050171 | A1 | 2/2017 | Yang et al. |
| 2017/0266641 | A1 | 9/2017 | Kim et al. |
| 2018/0147557 | A1* | 5/2018 | Hwang ................. C08F 220/06 |
| 2018/0297012 | A1* | 10/2018 | Kim ........................ C08K 5/092 |
| 2020/0398253 | A1* | 12/2020 | Kawada ................. B01J 20/043 |
| 2021/0179790 | A1 | 6/2021 | Lee et al. |
| 2021/0387162 | A1* | 12/2021 | Lee ............................ C08J 3/12 |
| 2022/0111351 | A1 | 4/2022 | Kim et al. |
| 2023/0390735 | A1* | 12/2023 | Park ........................ B01J 20/267 |

FOREIGN PATENT DOCUMENTS

| | | | |
|---|---|---|---|
| EP | 1510562 | A1 | 3/2005 |
| EP | 2048184 | A1 | 4/2009 |
| EP | 2116572 | A1 | 11/2009 |
| EP | 3056268 | A1 | 8/2016 |
| EP | 3243859 | A1 | 11/2017 |
| EP | 3722351 | A1 | 10/2020 |
| JP | S61016903 | A | 1/1986 |
| JP | S63267435 | A | 11/1988 |
| JP | H08253597 | A | 10/1996 |
| JP | H09241322 | A | 9/1997 |
| JP | 2004285202 | A | 10/2004 |
| JP | 2006068731 | A | 3/2006 |
| JP | 2011195780 | A | 10/2011 |
| JP | 2012509377 | A | 4/2012 |
| JP | 2012143755 | A | 8/2012 |
| JP | 2015016450 | A | 1/2015 |
| JP | 2021511408 | A | 5/2021 |
| KR | 20140107491 | A | 9/2014 |
| KR | 20160076559 | A | 7/2016 |
| KR | 20160084041 | A | 7/2016 |
| KR | 20160085017 | A | 7/2016 |
| KR | 20190069103 | A | 6/2019 |
| KR | 20190071319 | A | 6/2019 |
| KR | 20190088830 | A | 7/2019 |
| KR | 20200038056 | A | 4/2020 |
| KR | 20210036740 | A | 4/2021 |
| KR | 20210054474 | A | 5/2021 |
| KR | 20220057451 | A | 5/2022 |
| WO | 2004096304 | A1 | 11/2004 |
| WO | 2005092955 | A1 | 10/2005 |
| WO | 2006014031 | A1 | 2/2006 |
| WO | 2008110524 | A1 | 9/2008 |
| WO | 2015053372 | A1 | 4/2015 |

OTHER PUBLICATIONS

Third Party Observation for Application No. EP23730344.1 dated Jan. 17, 2025, pp. 1-10. (Date of submission: Oct. 31, 24).

Third Party Observation for Application No. EP23730344.1 dated Jan. 17, 2025, pp. 1-6. (Date of submission: Nov. 11, 24).

Third Party Observation for Application No. EP23730344.1 dated Sep. 4, 2024, pp. 1-10.

Third Party Observation for Application No. EP23730344.1 dated May 16, 2025. 8 pages.

* cited by examiner

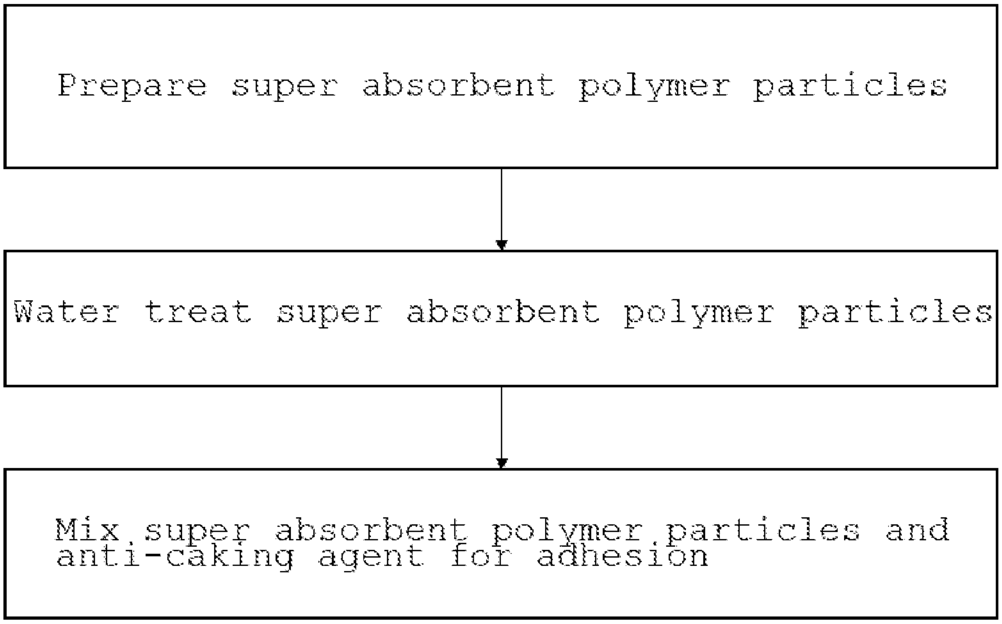
Prepare super absorbent polymer particles
Water treat super absorbent polymer particles
Mix super absorbent polymer particles and anti-caking agent for adhesion

METHOD FOR PREPARING SUPER ABSORBENT POLYMER COMPOSITE

CROSS-REFERENCE TO RELATED APPLICATIONS

The present application is a national phase entry under U.S.C. § 371 of International Application PCT/KR2023/000546, filed on Jan. 12, 2023, which claims priority from Korean Patent Application No. 10-2022-0085865, filed on Jul. 12, 2022, the entire contents of which are incorporated herein by reference.

TECHNICAL FIELD

The present invention relates to a method for preparing a super absorbent polymer composite, and more particularly, to a method for preparing a super absorbent polymer composite which has improved anti-caking efficiency of an anti-caking agent by adsorbing moisture on the surface of the super absorbent polymer particles by water treatment.

BACKGROUND ART

A super absorbent polymer (SAP) is a synthetic polymer material having a function of capable of absorbing about 500 times to 1000 times its own weight in water, and is named SAM (super absorbency material), AGM (absorbent gel material), and the like differently from developers. Since the super absorbent polymer as such started to put into practical use as a sanitary tool, it is currently widely used as materials for a soil repair agent for horticulture, a water stop material for civil engineering and construction, a seedling sheet, a freshness retainer in food distribution field, and poultice, and is mainly used in the field of sanitary products such as diapers and sanitary napkins.

Since the super absorbent polymer is a polymer having water absorbing properties, caking occurs in areas with high humidity, and in order to prevent the phenomenon, an anti-caking agent is added. As the anti-caking agent, an inorganic material which does not absorb water is generally used. Since the inorganic material prevents agglomeration between super absorbent polymer particles, it is used as an additive to improve permeability.

However, when the inorganic material is applied on the surface of the super absorbent polymer particles by dry mixing with the super absorbent polymer particles, application efficiency is lowered by weak attraction between the super absorbent polymer particles and the inorganic material. Accordingly, super absorbent polymer dust occurs and anti-caking efficiency is lowered.

DISCLOSURE

Technical Problem

In order to solve the problems mentioned in the Background Art, an object of the present technology is to provide a method for preparing a super absorbent polymer composite having improved anti-caking efficiency by water treating super absorbent polymer particles to adsorb moisture on a surface of the super absorbent polymer particles and mixing the water-adsorbed super absorbent polymer particles and an anti-caking agent.

Technical Solution

In one general aspect, a method for preparing a super absorbent polymer composite includes: preparing super absorbent polymer particles including a crosslinked polymer of an aqueous ethylenically unsaturated monomer having an at least partially neutralized acid group and an internal crosslinking agent, water treating the super absorbent polymer particles to adsorb moisture on the super absorbent polymer particles, and mixing the water-treated super absorbent polymer particles and an anti-caking agent to adhere the anti-caking agent on the water-treated super absorbent polymer particles.

Advantageous Effects

According to the method for preparing a super absorbent polymer composite of the present technology, in order to increase bonding between super absorbent polymer particles and an anti-caking agent, a water treatment is further performed before a process of mixing the super absorbent polymer particles and the anti-caking agent, thereby improving adhesive strength of the super absorbent polymer particles and the anti-caking agent to improve anti-caking efficiency. In addition, since it becomes possible to uniformly apply and adhere the anti-caking agent on the super absorbent polymer particles by the water treatment, a scattering phenomenon (dust issue) of the super absorbent polymer fine particles may be decreased.

DESCRIPTION OF DRAWINGS

The FIGURE is a process flow chart of a method for preparing super absorbent polymer composite according to an exemplary embodiment of the present invention.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

Hereinafter, the present invention will be described in more detail for better understanding of the present invention.

A method for preparing a super absorbent polymer composite according to an exemplary embodiment of the present technology may include: preparing super absorbent polymer particles including a crosslinked polymer of an aqueous ethylenically unsaturated monomer having an at least partially neutralized acid group and an internal crosslinking agent, water treating the super absorbent polymer particles to adsorb moisture on the super absorbent polymer particles, and mixing the water-treated super absorbent polymer particles and an anti-caking agent to adhere the anti-caking agent on the water-treated super absorbent polymer particles.

The present technology will be described in detail referring to the FIGURE. First, in the step of preparing the super absorbent polymer particles, a method of preparing the super absorbent polymer particles is as follows. First, a polymerization reaction of a composition is performed to form a hydrogel polymer. The composition may include an aqueous ethylenically unsaturated monomer, an internal crosslinking agent, and an additive such as a polymerization initiator, and other than that, a thickener, a plasticizer, a preservation stabilizer, and an antioxidant may be further included, if necessary.

Here, the aqueous ethylenically unsaturated monomer may be a (meth)acrylic acid or a salt thereof. For example, when an acrylic acid in which at least a part of acrylic acid is neutralized and/or an alkali metal salt such as a sodium salt thereof is/are used, super absorbent polymer particles having improved absorbency may be obtained.

Besides, the aqueous ethylenically unsaturated monomer may be an anionic monomer of anhydrous maleic acid, fumaric acid, crotonic acid, itaconic acid, 2-acryloylethanesulfonic acid, 2-methacryloylethanesulfonic acid, 2-(meth)acryloylpropanesulfonic acid, or 2-(meth)acrylamide-2-methylpropanesulfonic acid, or a salt thereof; a nonionic hydrophilicity containing monomer of (meth)acrylamide, N-substituted (meth)acrylate, 2-hydroxyethyl(meth)acrylate, 2-hydroxypropyl(meth)acrylate, methoxypolyethyleneglycol(meth)acrylate, or polyethyleneglycol(meth)acrylate; and an amino group-containing unsaturated monomer of (N,N)-dimethylaminoethyl (meth)acrylate, (N,N)-dimethylaminopropyl (meth)acrylamide, and a quaternary product thereof, and the salt of the anionic monomer may be a metal salt, a secondary metal salt, an ammonium salt, or an organic amine salt.

The aqueous ethylenically unsaturated monomer may include an at least partially neutralized acid group. The ethylenically unsaturated monomer including the at least partially neutralized acid group may be prepared by neutralizing an acid group of an aqueous ethylenically unsaturated monomer using a neutralizing agent. Here, the neutralizing agent may be a basic material such as sodium hydroxide (or caustic soda), potassium hydroxide, or ammonium hydroxide, which may neutralize an acid group.

The super absorbent polymer particles may include a crosslinked polymer which is crosslinked by an internal crosslinking agent. The internal crosslinking agent may serve to crosslink an unsaturated bond of the aqueous ethylenically unsaturated monomers described above to perform polymerization.

The internal crosslinking agent may be a (meth)acrylate-based compound which undergoes a crosslinking reaction by a free radical polymerization (FRP) reaction. Specifically, the internal crosslinking agent may be one or more compounds selected from the group consisting of ethyleneglycol di(meth)acrylate, polyethyleneglycol (meth)acrylate, polyethyleneglycol di(meth)acrylate, propyleneglycol di(meth)acrylate, polypropyleneglycol (meth)acrylate, butanediol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, and tetraethyleneglycol di(meth)acrylate. More specifically, among them, it may be polyethyleneglycol di(meth)acrylate.

Meanwhile, in the composition, the polymerization initiator may be a thermal polymerization initiator or a photopolymerization initiator by UV irradiation depending on a polymerization method. However, even in the case of using the photopolymerization method, a certain amount of heat is generated by UV irradiation, and as a polymerization reaction which is an exothermic reaction proceeds, some amount of heat is generated, and thus, a thermal polymerization initiator may be further included.

The photopolymerization initiator may be a compound capable of forming a radical by light such as ultraviolet rays. The photopolymerization initiator may be one or more selected from the group consisting of benzoin ether, dialkyl acetophenone, hydroxyl alkylketone, phenyl glyoxylate, benzyl dimethyl ketal, acyl phosphine, and α-aminoketone. Meanwhile, a specific example of acylphosphine may be diphenyl(2,4,6-trimethylbenzoyl)phosphineoxide, bis(2,4,6-trimethylbenzoyl)phenylphosphineoxide, ethyl (2,4,6-trimethylbenzoyl)phenylphosphinate.

In addition, the thermal polymerization initiator may be one or more selected from the initiator group consisting of a persulfate-based initiator, an azo-based initiator, hydrogen peroxide, and ascorbic acid. Specifically, an example of the persulfate-based initiator may be sodium persulfate ($Na_2S_2O_8$), potassium persulfate ($K_2S_2O_8$), ammonium persulfate ($(NH_4)_2S_2O_8$).

Specifically, a polymerization method is largely classified into thermal polymerization and photopolymerization depending on a polymerization energy source, and when thermal polymerization proceeds, it may be performed in a reactor having a stirring shaft such as a kneader, and when photopolymerization proceeds, it may be performed in a reactor provided with a movable conveyor belt.

The crosslinked polymer of the present technology may be prepared from a polymerization reaction of a composition including an aqueous ethylenically unsaturated monomer, an internal crosslinking agent, and a polymerization initiator, and the internal crosslinking agent in the composition may be included at 0.01 to 5 parts by weight with respect to 100 parts by weight of the aqueous ethylenically unsaturated monomer. For example, the internal crosslinking agent may be included at 0.01 parts by weight or more, 0.05 parts by weight or more, 0.1 parts by weight, or 0.2 parts by weight or more and 5 parts by weight or less, 3 parts by weight or less, 2 parts by weight or less, 1 part by weight or less, or 0.5 parts by weight or less with respect to 100 parts by weight of the aqueous ethylenically unsaturated monomer.

When the content of the internal crosslinking agent is excessively low, crosslinking does not sufficiently occur, and thus, it may be difficult to implement strength at or higher than an appropriate level, and when the content of the internal crosslinking agent is excessively high, internal crosslinking density is increased, and thus, it may be difficult to implement a desired water retention capacity.

The composition of the present technology may be prepared in the form of a solution dissolved in a solvent. Here, a usable solvent may be those which may dissolve the raw materials described above. For example, the solvent may be water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, N,N-dimethyl acetamide, or a mixture thereof.

In general, the super absorbent polymer particles including the crosslinked polymer prepared by polymerization of the aqueous ethylenically unsaturated monomer in the presence of the internal crosslinking agent have a hydrophilic surface by an acid group (—COOH) remaining without being polymerized and/or a neutralized acid group (—COO—). Due to the hydrophilicity of the surface of the super absorbent polymer particles, moisture in the air is absorbed upon exposure to the air, and thus, capillary forces, hydrogen bonding, inter-particular diffusion, or van der Waals forces between particles are generated by moisture present between the super absorbent polymer particles, and irreversible agglomeration between particles occurs. In addition, water is essentially used even during the process of preparing super absorbent polymer particles, and since the problem as described above arose, an additional pulverization process due to agglomeration between particles during the process is required or an anti-caking agent for preventing agglomeration is input.

Next, the step of drying, pulverizing, and classifying the hydrogel polymer formed by the polymerization reaction of the composition to obtain base resin powder follows. Here, in order to increase efficiency in drying the hydrogel polymer, a coarse pulverization process may be further performed. A pulverizer used in the coarse pulverization process may be any one selected from the group consisting of vertical pulverizer, a turbo cutter, a turbo grinder, a rotary cutter mill, a cutter mill, a disc mill, a shred crusher, a crusher, a chopper, and a disc cutter.

A hydrogel polymer which has been coarsely pulverized as described above or a hydrogel polymer which is not subjected to a coarse pulverization step and is immediately after polymerization may be subjected to a drying process. The drying method of the drying step may be, specifically, hot air supply, infrared irradiation, microwave irradiation, or ultraviolet irradiation. A moisture content of the polymer after performing the drying step may be 0.05 to 10 wt %.

The step of pulverizing the dried polymer obtained after the drying step as such is performed. Here, the pulverizer used may be, specifically, a ball mill, a pin mill, a hammer mill, a screw mill, a roll mill, a disc mill, or a jog mill.

Further, in order to manage the physical properties of the super absorbent polymer particles which are finally commercialized after the pulverization step as such, polymer powder obtained after pulverization may be subjected to a separate process of classifying depending on the particle diameter. Specifically, a polymer having a particle diameter of 150 to 850 μm is classified as normal particles, and may be commercialized after the step of a surface crosslinking reaction described later only for the polymer powder having the particle diameter as such. However, since the polymer having a particle diameter of less than 150 μm causes a phenomenon such as gel blocking, it is classified as fine particles and excluded. By the pulverization and classification processes as such, base resin powder may be obtained.

Next, the step of surface crosslinking reaction in which a surface crosslinked layer is formed on at least a part of the surface of the base resin powder in the presence of a surface crosslinking agent is performed. Here, the surface crosslinked layer may be crosslinked from the surface crosslinking agent, and the surface crosslinking agent includes a polyvalent epoxy compound, and the polyvalent epoxy compound may be a glycidyl ether compound of a polyhydric alcohol.

Specifically, the surface crosslinking agent may include one or more polyvalent epoxy compound selected from the group consisting of ethyleneglycol diglycidyl ether, diethyleneglycol diglycidyl ether, triethyleneglycol diglycidyl ether, tetraethyleneglycol diglycidyl ether, glycerin polyglycidyl ether, and sorbitol polyglycidyl ether.

The surface crosslinking agent may be mixed with the base resin powder in a solution state, specifically, a surface crosslinking solution state of being dissolved in a solvent. The surface crosslinking solution may include water and methanol, in addition to the surface crosslinking agent. Generally, the surface crosslinking solution is applied on the surface of the super absorbent polymer particles. Therefore, a surface crosslinking reaction occurs on the surface of super absorbent polymer particles, which improves crosslinking properties on the surface of the particles without substantially affecting the inside of the particles. Therefore, the surface crosslinked super absorbent polymer particles have a high crosslinking degree at the vicinity of the surface rather than in the inside. The polymer to which the surface crosslinking agent is added is heated, thereby performing both a surface crosslinking reaction and drying.

Finally, the step of classifying base resin powder on which the surface crosslinking layer has been formed may follow. The base resin powder on which the surface crosslinking layer has been formed may be completed into super absorbent polymer particles by a process of pulverization and classification. Thereafter, the super absorbent polymer particles are classified depending on its particle diameter, and super absorbent polymer particles having an appropriate particle diameter depending on the purpose of use may be commercialized. In general, the particles are classified into surface crosslinked fine powder having a particle diameter of less than 150 μm and surface crosslinked normal particles having a particle diameter of 150 μm to 850 μm, and the surface crosslinked normal particles may be commercialized as the super absorbent polymer particles of the present technology and used.

Since the super absorbent polymer particles have a characteristic of absorbing moisture, caking in which the particles absorb moisture in the air to agglomerate with each other occurs. Therefore, in order to prevent the phenomenon, an anti-caking agent is added, and conventionally, the anti-caking agent is dry mixed without a separate post process of the super absorbent polymer particles having the surface crosslinked layer formed thereon, or the anti-caking agent is mixed in the surface crosslinked solution during preparation of the super absorbent polymer particles, thereby forming a surface crosslinked layer.

When conventionally the anti-caking agent is dry mixed without a separate post treatment of the super absorbent polymer particles having the surface crosslinked layer formed thereon, application efficiency is lowered with weak attraction between the super absorbent polymer having the surface crosslinked layer formed thereon and the anti-caking agent, and the anti-caking agent may be released during transfer or handling in the process. In this case, scattering (dust issue) of the super absorbent polymer fine particles is greatly increased, and anti-caking efficiency is deteriorated. Here, the anti-caking efficiency refers to a degree to which caking (that is, an aggregated state by agglomeration between super absorbent polymer particles) is prevented and how sustainable the state is. In addition, the application efficiency refers to a degree of application uniformity of the anti-caking agent which is applied and adhered to the super absorbent polymer particles.

In addition, when conventionally, the anti-caking agent is mixed in the surface crosslinking solution to form the surface crosslinked layer, surface crosslinking efficiency is lowered by a change in viscosity of the surface crosslinking solution, and as a result, the absorption rate of the super absorbent polymer is lowered.

Regarding this, in the present technology, the super absorbent polymer particles having the surface crosslinked layer formed thereon are further water treated, and then mixed with the anti-caking agent, thereby increasing surface adhesive strength between the super absorbent polymer particles and the anti-caking agent without reducing the moisture absorption effect of the super absorbent polymer particles for moisture, and thus, the release and the scattering of the super absorbent polymer fine particles may be significantly decreased.

For this, according to an exemplary embodiment of the present invention, the super absorbent polymer particles prepared by the process described above may be water treated to adsorb moisture on the super absorbent polymer particles. The water treatment is a process of adsorbing a certain amount of moisture on the surface of the super absorbent polymer particles, and for example, is performed by placing the super absorbent polymer particles in an airtight container under normal pressure for a certain period of time in a hot and humid atmosphere. Meanwhile, moisture adsorbed on the surface of the super absorbent polymer particles diffuses into the super absorbent polymer particles over time and is absorbed.

The water treatment may be performed under the condition of 25° C. to 80° C., specifically 40° C. to 60° C. Thus, an appropriate amount of moisture around the super absorbent polymer particles may be maintained to allow smooth water treatment. When the temperature is at or higher than 25° C., moisture may be adsorbed on the surface of the super absorbent polymer particles, thereby increasing the efficiency of water treatment. When the temperature is at or lower than 80° C., excessive water vapor production may be prevented, and caking between particles, which occurs when the moisture, that is, the water vapor is adsorbed on the surface of the super absorbent polymer particles and then absorbed into the particles, may be prevented.

Specifically, the water treatment temperature may be an internal temperature of a thermo-hygrostat when the water treatment proceeds in the thermo-hygrostat described later, or may be a droplet temperature when the water treatment is performed by a spray water treatment.

The water treatment according to an exemplary embodiment of the present invention may be performed under the condition of 50% RH to 95% RH, specifically 80% RH to 90% RH. Here, "% RH" is a unit of a relative humidity, and is a current amount of water vapor expressed as a percentage, when the maximum amount of the water vapor to be included at a certain temperature is 100. When the relative humidity is less than 50% RH, it is difficult to form and maintain water vapor due to excessively low humidity, and thus, it may be difficult to water treat the super absorbent polymer particles with an appropriate amount of moisture. Accordingly, adhesive strength between the anti-caking agent described later and the super absorbent polymer particles is decreased to cause release. When the relative humidity is more than 95% RH, moisture is already excessively adsorbed and absorbed on the super absorbent polymer particles in the water treatment step due to excessively high humidity, and thus, moisture absorption ability which is the original purpose of the super absorbent polymer particles may be deteriorated.

The water treatment may be performed for 3 minutes to 15 minutes, more specifically 3 minutes to 10 minutes. When the water treatment is performed for less than 3 minutes, a sufficient amount of moisture is not adsorbed so that the anti-caking agent described later is not adhered to the super absorbent polymer particles. However, when the water treatment is performed for more than 15 minutes, since the water treatment is performed for a long time, excessive moisture is adhered to the super absorbent polymer particles, and thus, viscosity between the super absorbent polymer particles occurs in a state in which the amount of moisture is larger than that of the anti-caking agent, thereby making it difficult to prevent caking.

The water treatment proceeds under the conditions described above, and as a means to create the conditions, for example, the water treatment may proceed in a thermo-hygrostat or by a method of directly spraying moisture. By the water treatment as such, moisture may be adsorbed on the surface of the super absorbent polymer particles. The adsorbed moisture may diffuse into the super absorbent polymer particles.

By the water treatment, the weight of the moisture adsorbed on the super absorbent polymer particles may be 1 wt % to 4 wt % with respect to 100 wt % of the super absorbent polymer particles. Specifically, the weight may be 2 wt % to 3 wt %.

When the moisture content is less than 1 wt %, too little moisture is adsorbed on the surface of the super absorbent polymer particles, so that it may be difficult for the anti-caking agent described later to sufficiently adhere to the surface of the super absorbent polymer particles. Therefore, it may be difficult for the anti-caking agent to act as the anti-caking agent to alleviate agglomeration between super absorbent polymer particles, and thus, anti-caking efficiency may be lowered.

When the moisture content is more than 4 wt %, moisture is excessively adhered to the surface of the super absorbent polymer particles by the water treatment, so that the super absorbent polymer particles may have deteriorated absorption performance less than originally intended performance. Therefore, it may be difficult to implement a desired level of absorption performance of the finally prepared super absorbent polymer composite. In addition, viscosity occurs due to excessively adsorbed moisture as compared with the anti-caking agent, and thus, irreversible agglomeration between the super absorbent polymer particles occurs to rather form caking.

Here, the amount of adsorbed moisture may be measured according to the method of International Organization for Standardization (ISO), 171904-4:2001.

Next, according to an exemplary embodiment of the present invention, the step of mixing the water-treated super absorbent polymer particles and the anti-caking agent to adhere the anti-caking agent on the water-treated super absorbent polymer particles is performed. As described above, the anti-caking agent may be uniformly adhered to the super absorbent polymer particles by the water treatment, and also, the anti-caking agent may be adhered to the super absorbent polymer particles with high adhesive strength. Thus, anti-caking efficiency may be increased.

The anti-caking agent may be one or more of fumed silica, alumina, silica, and titania. Here, the anti-caking agent may be an inorganic material which usually does not absorb moisture, and the inorganic material may be silica, fumed silica, clay, alumina, a silica-alumina composite material, titania, zinc oxides, or silicate, and among them, any one or a mixture of two or more may be used. Since the inorganic material does not absorb moisture in the air unlike the super absorbent polymer particles, agglomeration between particles due to excessive moisture adsorption of the super absorbent polymer particles may be prevented.

The anti-caking agent may have a diameter of, for example, 3 μm to 30 μm when it is fumed silica, in the relation with the diameter of the super absorbent polymer particles. Here, the diameter may be measured by a dry particle size analyzer, Mictrotac S3500.

Meanwhile, the mixing of the water-treated super absorbent polymer particles and the anti-caking agent of the present technology may be performed immediately after the water treatment of the super absorbent polymer particles or within 6 hours after the water treatment. Here, immediately after the water treatment may refer to a period from as soon as the water treatment is finished to within 2 minutes after the water treatment. More specifically, when the mixing is performed immediately after the water treatment, the anti-caking agent is uniformly applied on the surface of the water-treated super absorbent polymer particles to further maximize the anti-caking efficiency by the anti-caking agent. When the mixing is performed within 6 hours after the water treatment, attraction between the water-treated super absorbent polymer particles and the anti-caking agent is strongly formed to increase adhesive strength. Therefore, the super absorbent polymer particles may absorb a large amount of moisture in the air to prevent occurrence of irreversible agglomeration.

The amount of the anti-caking agent input to the mixing may be 0.05 wt % to 0.15 wt % with respect to 100 wt % of the super absorbent polymer particles. Specifically, the weight may be 0.08 wt % to 0.12 wt %. More specifically, when the weight of the anti-caking agent is 0.08 wt % or more, occurrence of agglomeration between super absorbent polymer particles which have absorb moisture in the air may be effectively prevented by the anti-caking agent. When the weight of the anti-caking agent is 0.12 wt % or less, the anti-caking agent is adsorbed in an appropriate amount with respect to the weight of the super absorbent polymer particles, and thus, anti-caking efficiency may be maintained in a good state without being significantly decreased even during long-term storage. In addition, since a common anti-caking agent uses an inorganic material which does not absorb moisture, deterioration of moisture absorption ability which is the original function of the super absorbent polymer composite, which is due to the adherence of an excessive amount of the inorganic material on the surface of the super absorbent polymer particles, may be prevented.

Here, the mixing may be inputting the water-treated super absorbent polymer particles and the anti-caking agent to a container, for example, an airtight container and then performing mixing under stirring.

By the mixing, the viscosity or the stickiness of the super absorbent polymer particles is increased after the water treatment, in addition to the electrostatic attraction between the super absorbent polymer particles and the anti-caking agent, and thus, the super absorbent polymer particles and the anti-caking agent may be adhered to each other.

Hereinafter, the present invention will be described in more detail by the examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

(1) Preparation of Super Absorbent Polymer Particles

In a 3 L glass container equipped with an agitator and a thermometer, 100 g (1.388 mol) of acrylic acid, 0.26 g of polyethyleneglycol diacrylate (PEGDA) as an internal crosslinking agent, 0.008 g of diphenyl (2,4,6-trimethylbenzoyl)phosphine oxide as a photopolymerization initiator which was a polymerization initiator, 0.20 g of sodium persulfate as a thermal polymerization initiator, and 123.5 g of a 32% caustic soda (NaOH) solution as a neutralizing agent were mixed with water so that a solid content was 45.0 wt %, thereby preparing a composition.

Thereafter, the composition was supplied on a conveyor belt in which a belt having a width of 10 cm and a length of 2 m rotated at a speed of 10 cm/min. At this time, a polymerization reaction was performed for 20 minutes on a conveyor belt equipped with a light source, thereby obtaining a hydrogel polymer having a water content of 45 wt %.

Next, the hydrogel polymer was pulverized using a pulverizer. Thereafter, the pulverized product was dried by hot air at 185° C. for 30 minutes using an air-flow oven. The pulverization, drying, and classification were performed to obtain base resin powder.

To 100 g of the base resin powder, a surface crosslinking solution in which water, methanol, and ethyleneglycol diglycidyl ether which was a surface crosslinking agent were mixed was input, and then a surface crosslinking reaction was performed at 198° C. Further, the product was pulverized and classified to prepare 150 g of super absorbent polymer particles having a diameter of 150 to 850 μm.

(2) Preparation of Super Absorbent Polymer Composite 150 g of the super absorbent polymer particles prepared in the preparation of the super absorbent polymer particles were evenly spread on a SUS tray of 240 mm×180 mm×10 mm and input to a thermo-hygrostat. In the thermo-hygrostat, a water treatment was performed for 10 minutes under the condition of 40° C., 80% RH, and at this time, 3 g of moisture (2 wt % of moisture with respect to 100 wt % of the super absorbent polymer particles) was adsorbed on 150 g of the super absorbent polymer particles input to the thermo-hygrostat. The amount of moisture adsorbed was measured according to the method of International Organization for Standardization (ISO), 17190-4:2001.

Thereafter, the super absorbent polymer particles within 2 minutes of water treatment (immediately after water treatment) and 0.15 g of fumed silica (0.10 wt % of fumed silica with respect to 100 wt % of the super absorbent polymer particles) were input to an airtight container. As the airtight container was shaken for mixing, the water-treated super absorbent polymer particles and fumed silica were attached to each other. Therefore, a super absorbent polymer composite in which the water-treated super absorbent polymer particles and fumed silica were attached to each other was prepared.

Example 2

A super absorbent polymer composite was prepared in the same manner as in Example 1, except that the water treatment was performed for 12 minutes to adsorb 4.5 g of moisture (3 wt % of moisture with respect to 100 wt % of the super absorbent polymer particles) on the super absorbent polymer particles.

Example 3

A super absorbent polymer composite was prepared in the same manner as in Example 1, except that the water treatment was performed for 14 minutes to adsorb 6 g of moisture (4 wt % of moisture with respect to 100 wt % of the super absorbent polymer particles) on the super absorbent polymer particles.

Example 4

A super absorbent polymer composite was prepared in the same manner as in Example 1, except that 0.08 g of fumed silica (0.05 wt % of fumed silica with respect to 100 wt % of the super absorbent polymer particles) was input to the airtight container.

Example 5

A super absorbent polymer composite was prepared in the same manner as in Example 1, except that 0.23 g of fumed silica (0.15 wt % of fumed silica with respect to 100 wt % of the super absorbent polymer particles) was input to the airtight container.

Example 6

A super absorbent polymer composite was prepared in the same manner as in Example 1, except that the water treatment was not performed in a thermo-hygrostat, but performed by direct spraying to adsorb 3 g of moisture (2 wt % of moisture with respect to 100 wt % of the super absorbent polymer particles) on the super absorbent polymer particles.

Example 7

A super absorbent polymer composite was prepared in the same manner as in Example 1, except that the water treatment was not performed in a thermo-hygrostat, but performed by direct spraying to adsorb 4.5 g of moisture (3 wt % of moisture with respect to 100 wt % of the super absorbent polymer particles) on the super absorbent polymer particles.

Example 8

A super absorbent polymer composite was prepared in the same manner as in Example 1, except that the water treatment was performed for 5 minutes to adsorb 0.8 g of moisture (0.5 wt % of moisture with respect to 100 wt % of the super absorbent polymer particles) on the super absorbent polymer particles.

Example 9

A super absorbent polymer composite was prepared in the same manner as in Example 1, except that the water treatment was performed for 7 minutes to adsorb 1.5 g of moisture (1 wt % of moisture with respect to 100 wt % of the super absorbent polymer particles) on the super absorbent polymer particles.

Example 10

A super absorbent polymer composite was prepared in the same manner as in Example 1, except that the water treatment was performed for 15 minutes to adsorb 9 g of moisture (6 wt % of moisture with respect to 100 wt % of the super absorbent polymer particles) on the super absorbent polymer particles.

COMPARATIVE EXAMPLES

Comparative Example 1

A super absorbent polymer composite was prepared in the same manner as in Example 1, except that super absorbent polymer particles which were not water treated were used.

Comparative Example 2

A super absorbent polymer composite was prepared in the same manner as in Example 1, except that fumed silica was not input and mixed.

Comparative Example 3

A super absorbent polymer composite was prepared in the same manner as in Example 1, except that the mixing was performed using the super absorbent polymer particles after 24 hours of the water treatment, not immediately after the water treatment.

Experimental Examples

Anti-caking (A/C) efficiency of the super absorbent polymer composites prepared in the examples and the comparative examples was measured. At this time, the anti-caking efficiency was measured after storing the super absorbent polymer composites prepared in the examples and the comparative examples in an airtight container for 4 hours, and the results are shown in the following Table 1:

TABLE 1

| | Water treatment method | Moisture adsorption amount in water treatment (wt %) | Input amount of anti-caking agent (wt %) | Anti-caking efficiency (%)[1)] |
|---|---|---|---|---|
| Example 1 | Thermo-hygrostat | 2 | 0.10 | 97.6 |
| Example 2 | 40° C., 80° C. % RH | 3 | | 96.2 |
| Example 3 | | 4 | | 80.6 |
| Example 4 | | 2 | 0.05 | 92.7 |
| Example 5 | | 2 | 0.15 | 97.6 |
| Example 6 | Spray watering | 2 | 0.10 | 97.4 |
| Example 7 | | 3 | | 96.4 |
| Example 8 | Thermo-hygrostat | 0.5 | 0.10 | 58.0 |
| Example 9 | 40° C., 80° C. % RH | 1 | | 82.4 |
| Example 10 | | 6 | | 61.0 |
| Comparative Example 1 | — | — | 0.10 | 42.5 |
| Comparative Example 2 | | 2 | — | 37.2 |
| Comparative Example 3 | Thermo-hygrostat 40° C., 80° C. % RH | 2 | 0.10 | 50.1[2)] |

[1)]In Examples 1 to 10 and Comparative Examples 1 and 2, it is anti-caking efficiency measured after inputting the super absorbent polymer particles and the anti-caking agent to the airtight container immediately after the water treatment (within at least 2 minutes after the water treatment) and performing mixing.

[2)] In Comparative Example 3, it is anti-caking efficiency measured after inputting the super absorbent polymer particles after 24 hours of the water treatment and the anti-caking agent to the airtight container and performing mixing.

The anti-caking efficiency of the super absorbent polymer composite prepared by the method for preparing a super absorbent polymer composite described above was measured according to the following Equation 1. Here, the anti-caking efficiency was measured while the moisture absorption degree was maintained at 38% to 44%, thereby securing the reproducibility of the anti-caking efficiency analysis. The moisture absorption degree may be adjusted according to the following Equation 2:

$$\text{Anti-caking efficiency (\%)} = \frac{W4}{W3 - W1} \quad \text{[Equation 1]}$$

$$\text{Moisture absorption degree (\%)} = \frac{W3 - W1 - W2}{W2} \quad \text{[Equation 2]}$$

wherein W1 is a weight of aluminum dish of 57 mm, W2 is a weight of a sample measured by sampling 0.76 g to 0.84 g of the samples of the super absorbent polymer composites prepared in Examples 1 to 10 and Comparative Examples 1 to 3, and W3 is the sum of the weight of the dish of W1 and the weight of the super absorbent polymer composite having moisture adsorbed thereon after water treating the super absorbent polymer composite of W2 on the dish for 10 minutes under the condition of 80° C., 95% RH in a thermo-hygrostat. The water-treated super absorbent polymer composite while it was on the dish was input to a 1400 μm mesh, and a sieve shaker was operated for 10 seconds under the condition of 1.0 mm/g of amplitude. Finally, the weight of the super absorbent polymer composite passing through the 1400 μm mesh was measured and represented as W4.

As shown in Table 1, the anti-caking efficiency of the examples was significantly higher than that of the comparative examples. Thus, it was confirmed that the anti-caking efficiency may be maximized by water treating the super absorbent polymer particles. In addition, it was found that the adhesive strength between the super absorbent polymer particles and the anti-caking agent was also increased by the water treatment.

In addition, in Comparative Example 1, the super absorbent polymer particles which were not water treated were mixed with the anti-caking agent, and it was confirmed that the anti-caking efficiency was significantly deteriorated as compared with Examples 1 to 3 and 6 to 10 in which 0.15 g of fumed silica (0.10 wt % of fumed silica with respect to 100 wt % of the super absorbent polymer particles) was input. Thus, it was confirmed that the water treatment has a great influence on the improvement of the anti-caking efficiency.

In Comparative Example 2, the anti-caking efficiency of the super absorbent polymer composite, which was not mixed with the anti-caking agent in Example 1, was measured. The super absorbent polymer composite to which the anti-caking agent was not input was in a state in which moisture was already adsorbed by the water treatment, and thus, viscosity between the super absorbent polymer particles occurred to form agglomeration. Since the anti-caking agent to prevent this was also not input, it was confirmed that the anti-caking efficiency was worst among the examples and the comparative examples of the present experiment.

Meanwhile, in Comparative Example 3, the anti-caking efficiency of the super absorbent polymer composite which was prepared in the same manner as in Example 1, except that the mixing was performed using super absorbent polymer particles after 24 hours of the water treatment, not the super absorbent polymer particles immediately after the water treatment, was measured. It was confirmed that the anti-caking efficiency of Comparative Example 3 was decreased by about 49% as compared with Example 1. Therefore, when the super absorbent polymer particles after one day of the water treatment was used as in Comparative Example 3 in the mixing of the super absorbent polymer particles and fumed silica, it was confirmed that the fumed silica was not strongly adhered to the super absorbent polymer particles. Therefore, since the caking problem was not solved, which is the role of the anti-caking agent, it was confirmed that the anti-caking efficiency of Comparative Example 3 was significantly deteriorated.

The invention claimed is:

1. A method for preparing a super absorbent polymer composite, the method comprising:

preparing super absorbent polymer particles including a crosslinked polymer of an aqueous ethylenically unsaturated monomer having an at least partially neutralized acid group and an internal crosslinking agent;

water treating the super absorbent polymer particles to adsorb moisture on the super absorbent polymer particles; and mixing the water-treated super absorbent polymer particles and an anti-caking agent to adhere the anti-caking agent on the water-treated super absorbent polymer particles, wherein the water treatment is performed by inputting the super absorbent polymer particles to a thermo-hygrostat, the water treatment is performed under a condition of 50% RH to 95% RH, and the weight of the moisture adsorbed on the super absorbent polymer particles by the water treatment is 1 wt % to 4 wt % with respect to 100 wt % of the super absorbent polymer particles.

2. The method for preparing a super absorbent polymer composite of claim 1, wherein the water treatment is performed under a condition of 25° C. to 80° C.

3. The method for preparing a super absorbent polymer composite of claim 1, wherein the water treatment is performed for 3 minutes to 15 minutes.

4. The method for preparing a super absorbent polymer composite of claim 1, wherein the mixing of the water-treated super absorbent polymer particles and the anti-caking agent is performed immediately after the water treatment of the super absorbent polymer particles or within 6 hours after the water treatment.

5. The method for preparing a super absorbent polymer composite of claim 1, wherein the weight of the anti-caking agent input to the mixing is 0.05 wt % to 0.15 wt % with respect to 100 wt % of the super absorbent polymer particles.

6. The method for preparing a super absorbent polymer composite of claim 1, wherein the aqueous ethylenically unsaturated monomer is a (meth)acrylic acid or a salt thereof.

7. The method for preparing a super absorbent polymer composite of claim 1, wherein the anti-caking agent is one or more selected from the group consisting of fumed silica, alumina, silica, and titania.

* * * * *